UNITED STATES PATENT OFFICE.

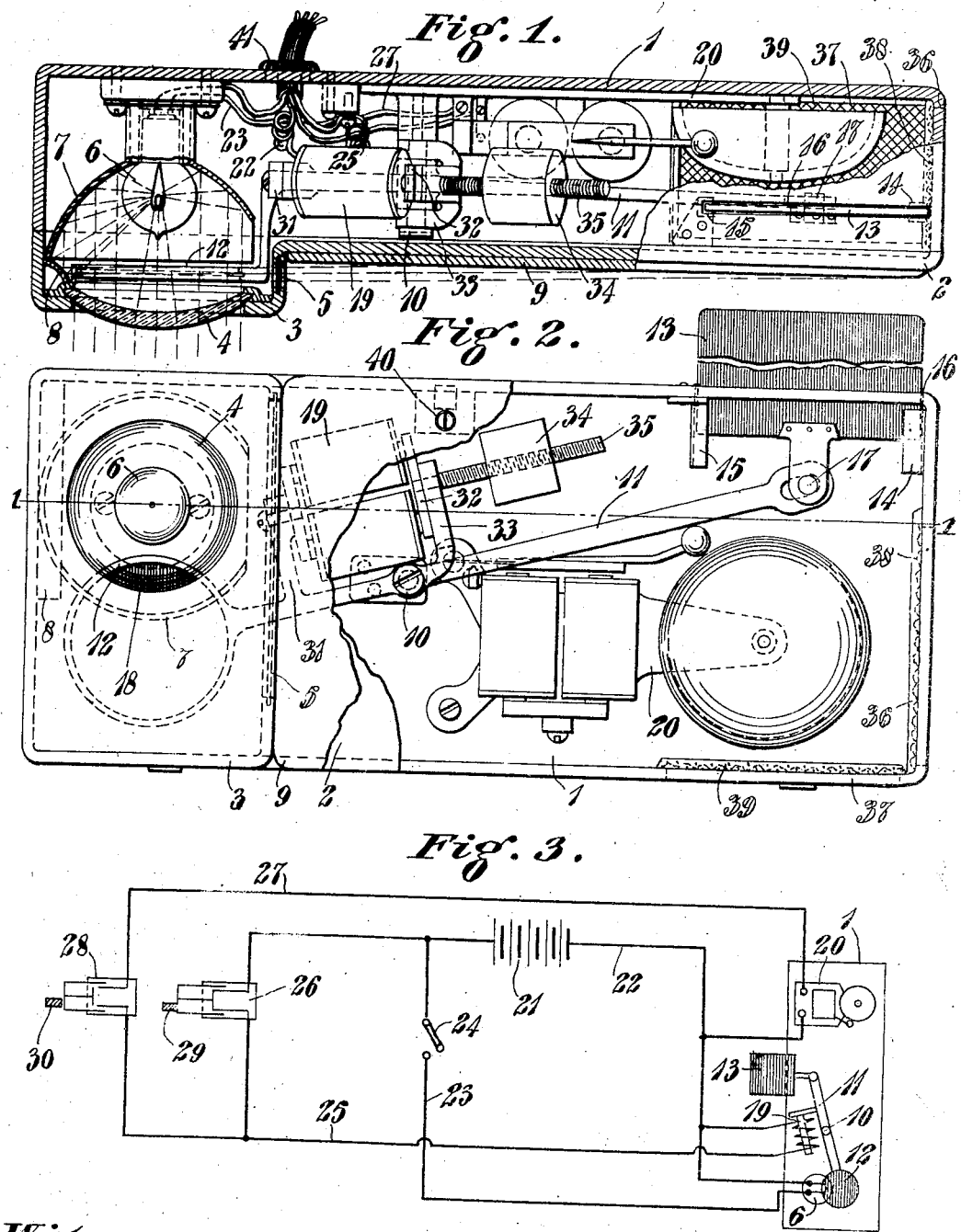

JOHN EMIL SULLIVAN, OF COVINGTON, KENTUCKY.

SIGNAL APPARATUS.

1,285,459.    Specification of Letters Patent.    Patented Nov. 19, 1918.

Application filed December 14, 1916. Serial No. 136,881.

*To all whom it may concern:*

Be it known that I, JOHN EMIL SULLIVAN, a citizen of the United States, and a resident of Covington, in the county of Kenton and State of Kentucky, have invented certain new and useful Improvements in Signal Apparatus, of which the following is a specification.

My invention relates to signals and lighting devices for vehicles, especially motor vehicles, and its object is to avoid collisions with objects, especially pedestrians, and preferably to effectively light the roadway during backward movement of the vehicle, while at other times providing a tail light and preferably illuminating the license tag at the rear of the motor vehicle. A further object is to accomplish the above result by simple means and with a minimum expenditure of energy.

My invention consists in the combination of parts and in the details of construction and arrangement of parts as will hereinafter be more fully described and claimed.

In the drawings:

Figure 1 is a sectional plan view of a device embodying my invention, the section being taken on a plane corresponding to the line 1—1 of Fig. 2;

Fig. 2 is a front elevation of the same represented as having part of the door broken away; and Fig. 3 is a diagram illustrating the arrangement of a signal system in which I prefer to use my invention.

This signal system is disclosed and claimed in my co-pending application executed on the same day as this one and will be described herein only to the extent of elucidating the preferred use of my invention disclosed and claimed herein.

As I prefer to construct my invention, there is a box 1, preferably of heavy sheet metal, with one side made up of a door 2 that is hinged along the bottom of the box to drop downwardly. The minor part 3 of this door, near one end of the box, extends farther rearwardly than the other part and has an opening in which is fitted a glass 4 after the manner of an ordinary tail lamp, but preferably of clear glass. The side of this extended minor part next to the other part of the door is also preferably provided with an opening fitted with a clear glass 5.

Inside the box, in line with the glass 4, is an electric lamp 6 provided with a reflector 7 of any suitable formation to project light out through the glass 4; this opening with this glass 4 being the main light passage of the device. Also in conjunction with the lateral light passage, which has the glass 5, I prefer to provide, at the opposite side of the main light passage, a suitable reflector 8 for reflecting part of the rays of the lamp 6 sidewise through the glass 5, to be projected on any displayed article, such as the license tag 9, mounted on the less extended major part of the door 2.

It will be understood that when this box is mounted on the rear of the vehicle, the side having the door 2 will be presented rearwardly of the vehicle; but since it seems less confusing to refer to this part of the device as the front, and the opposite closed side as the rear, such terms will hereinafter be used in this way.

Thus, fixed on the rear side of the box, interiorly thereof and projecting forwardly, is a stud 10, which forms a mounting or pivot for the semaphore bar or member 11, in such a manner that this bar or member 11 may swing up or down; one of its ends swinging up as the other swings down; and having connected to it and comprising a spectacle glass or light-transmitting semaphore element 12 at one end; and an opaque semaphore element 13 at the other end; so that either element swings up with the corresponding end of the bar or member 11, while the other element swings down with the corresponding other end. The parts are preferably so proportioned and positioned that the spectacle glass 12, when up, substantially coincides with the main light passage or glass 4 and the lamp 6; and this spectacle glass 12 being of a suitable color, preferably red, is thus, when in that position, adapted to constitute the device a tail lamp for the vehicle. The opaque semaphore element 13 is as here shown mounted to travel vertically in guides 14 and 15, mounted inside the box 1, near the top thereof, and to project through the slot 16 coinciding with these guides; and this element having an articulated connection 17 with the bar 11.

When the light-transmitting element or spectacle glass 12 is up, as above described, this opaque element 13 is down inside the box 1 and concealed. But when the semaphore member 11 tilts in the other direction, this opaque element 13 is pushed up through a slot 16 and displayed above the top of the box; and the light-transmitting element or spectacle glass 12 is moved downward from before the lamp or light source 6, so that the clear white light is permitted to shine out through the main light passage with its clear glass 4, and thus more effectively lighting the roadway than when the colored glass 12 is before the light source. For use as a visible-alarm device as well as lighting device at night, I prefer to have this colored glass moved downward only to such an extent that it remains partly before the light source 6, so that a small segment 18 of the main light passage, still comprises colored glass. Thus the major part of the main light passage permits white light to pass, while a sufficient part of it still transmits colored light enough to attract attention and act as a visible-alarm; while the brighter white light, of course in itself acts as an alarm. In fact the peculiar combination of a patch of white light and the smaller patch of colored light is so different from either an all white light or an all colored light, that this peculiarity adds to the alarming effect that would be produced by either kind of light alone.

For causing the semaphore member or bar 11 to tilt one way or the other and change the position of its elements 12 and 13, or either of them used singly, or whether the light transmitting element 12, or an opaque element is moved before the light source, and whatever the extent of such movement, I prefer to provide an electro-magnetic means which may be controlled by the driver of the vehicle while he remains in his seat and preferably without any special thought on his part, as by suitable means operating in conjunction with one or more of the manipulating members of the vehicle.

Thus as exemplified in the diagram of Fig. 3, the semaphore member 11 and its elements 12 and 13, swinging on the pivot 10, are represented as being actuated by an electro-magnet 19, which is represented diagrammatically, as are also the light source 6 and an ordinary electric bell 20 and the box 1, inclosing all these parts.

A suitable current source is exemplified by the primary battery 21, from opposite terminals of which lead conductors 22 and 23 to respective terminals of the electric lamp or light source 6; the latter conductor including a suitable switch 24 for turning on and off the light in the device. The electro-magnet 19 has one end of its coil connected to the conductor 22 and the other end is connected by a conductor 25 to one terminal of the electric switch 26, which has its outer terminal connected to the conductor 23 between the switch 24 and battery 21; so that when this switch 26 is closed as represented in Fig. 3, a circuit will be completed through the electro-magnet 19 whether the switch 24 is closed and the lamp 6 lighted or not. The electric bell 20 has one terminal connected to the conductor 22 and has its other terminal connected by a conductor 27 to one terminal of another switch 28, similar to the switch 26 and which other switch 28 has its other terminal connected to the conductor 25. If this other switch 28 is closed while the first switch 26 is closed, a circuit will be completed through the bell 20, to sound an audible-alarm; and the closure of the switch 26 will already have caused the electro-magnet 19 to shift the semaphore element 11 to a position indicated in Fig. 3, thus causing the visible-alarm, and with the lighting arrangement above described, more thoroughly illuminating the roadway.

For the purpose of the present application, and not repeating what is fully described in my co-pending application above referred to, it may be stated that the switches 26 and 28 are successively closed by the engagement of successively moved manipulating members 29 and 30 in the course of preparing the vehicle for backward movement and then causing such movement.

As represented in the diagram in Fig. 3, it may appear that the electro-magnet 19 is stationary and attracts the element 11 when energized and allows the element to move in the other direction when deënergized. But for the member 11 to move away from the electro-magnet 19 when not attracted, one end must be sufficiently heavier than the other to cause this movement; or some other means must be provided to cause this movement; in any such case necessitating sufficient strength of magnetic field to overcome this excess of weight when the member is to be attracted.

It will be understood that my invention, so far as described, comprehends the use of the electro-magnet in this manner. But in order to lessen the amount of current required, I prefer my novel construction and arrangement, specifically shown in Figs. 1 and 2, in which the electro-magnet 19 as well as the semaphore member 11 swings up and down and is connected to the semaphore member, so that its weight contributes to the force for tilting the member 11 in one direction. As here shown, the magnet 19 is fixed on an upwardly extending bracket 31, forming part of the member 11 between the pivot 10 and the light source 6, at such a distance from the pivot that the center of gravity of the electro-magnet 19 is disposed on this side of the pivot 10. The armature 32 of the electro-magnet 19 is made movable relative both to the electro-magnet 19 and the member 11, and so disposed that when it engages the latter its weight contributes to the force for tilting the member 11 downward on the other side of the pivot 10; and when drawn over to the electro-magnet 19 this weight is added to that of the electro-magnet on the side of the pivot next to the light source 6. As here shown, this movement of the armature 32 is provided for by mounting it on a forked yoke 33, the members of which flank the member 11 on the pivot 10, so that the armature 32 is thus coaxial with the member 11.

Also, in order that the proper disposition of the weight of the armature element relative to that of the electro-magnet and connected parts may be made, I prefer to let the armature element comprise a counterweight 34, that has a threaded central opening, through which a threaded stud 35 projects from the yoke 33 and armature 32. Thus, by turning the weight 34, it may be adjusted along the stud 35 to effect the desired result; and the only work that the electro-magnet 19 must do, is to overcome the weight of the armature element, thus, or otherwise made up.

As shown, the armature element is drawn against the electro-magnet 19, so that the common center of gravity of the armature element and the electro-magnet is on the side of the pivot next to the light source; and consequently the light transmitting element 12 is partially removed from before the light source, while the element 13 is raised and displayed. When the electro-magnet is deenergized, the armature element will fall away until the lower edge of the yoke 33 engages with the upper side of the member 11; and the weight of the armature element will now be subtracted from the weight on the side of the pivot next to the light source and added to that on the other side; and, the weights of the other parts of the semaphore member on the respective sides of the pivot being substantially equal, the semaphore member will now be tilted in the other direction, bringing the one element 12 before the light source and lowering and concealing the other element 13.

The electric bell 20 is preferably mounted on the inside of the rear of the box 1, to the rear of and below the semaphore element 11; and the adjacent end and bottom of the box are preferably provided with openings 36 and 37, respectively, for the freer passage of sound from the bell. To prevent tampering with the interior mechanism, these openings 36 and 37 are preferably provided with woven wire nettings 38 and 39, respectively. The door 2 may have a lock 40. The several conductors 22, 23, 25 and 27 lead from the respective devices, through an insulating bushing 41 in the rear of the box.

It will be understood from the foregoing disclosure that my invention is susceptible to considerable modification under different conditions of use, and therefore I do not wish to be understood as being limited precisely to the disclosures herein made as examples of my invention, but what I claim as new and desire to secure by Letters Patent is:

1. In signal apparatus, a semaphore member, an electro-magnet connected to said semaphore member and having a mounting on which it swings up and down, and an armature element for said electro-magnet mounted to swing up and down with said electro-magnet and also to swing substantially in the plane of swinging of said electro-magnet, toward or away from said electro-magnet as said electro-magnet is energized or deënergized with its center of gravity located on the side of said mounting away from said electro-magnet and being of such weight and in such position relative to said electro-magnet and the resistance of the semaphore member connected thereto that the preponderance is on one side the mounting when said electro-magnet is deënergized, but is transferred to the other side of said mounting when said electro-magnet is energized.

2. In signal apparatus, a semaphore member, an electro-magnet connected to said semaphore member and having a mounting on which it swings up and down, an armature for said electro-magnet mounted to swing up and down with said electro-magnet and also to swing substantially in the plane of swinging of said electro-magnet, toward or away from said electro-magnet as said electro-magnet is energized or deënergized, and a counterweight mounted on said armature for adjustment toward or away from the said mounting of said armature, whereby the center of gravity of said armature and counterweight is located on the side of said mounting away from said electro-magnet, and said armature being of such weight and in such position relative to said electro-magnet and the resistance of the semaphore member connected thereto that the preponderance is on one side of the mounting when said electro-magnet is deënergized, but is transferred to the other side of said mounting when said electro-magnet is energized.

3. In signal apparatus, a semaphore member, an electro-magnet connected to said semaphore member and having a pivot on which it swings up and down, an armature element for said electro-magnet pivoted coaxially with said electro-magnet, to swing toward or away from said electro-magnet as said electro-magnet is energized or deënergized, with its center of gravity located on the side of said pivot away from said electro-magnet, and said armature element being of such weight and in such position relative to said electro-magnet and the resistance of the semaphore member connected thereto that the preponderance is on the side of said pivot away from said electro-magnet when said electro-magnet is deënergized, but is transferred to the other side of said pivot when said electro-magnet is energized.

4. In signal apparatus, a semaphore member having a mounting on which it swings up and down, an electro-magnet mounted on said member with its center of gravity disposed at one side of said mounting, and an armature element for said electro-magnet mounted on said semaphore member to move substantially in the plane of swinging of said semaphore member, toward or away from said electro-magnet as said electro-magnet is energized or deënergized, with its center of gravity located on the other side of said mounting, and being of such weight and in such position relative to said semaphore member and electro-magnet that the preponderance is on one side of the mounting when said electro-magnet is deënergized, but is transferred to the other side of said mounting when said electro-magnet is energized.

5. In signal apparatus, a semaphore member having a mounting on which it swings up and down, an electro-magnet mounted on said member with its center of gravity disposed at one side of said mounting, an armature for said electro-magnet mounted on said semaphore member to move substantially in the plane of swinging of said semaphore member, toward or away from said electro-magnet as said electro-magnet is energized or deënergized, and a counterweight mounted on said armature for adjustment toward or away from said mounting of said armature, whereby the center of gravity of said armature and counterweight is located on the other side of said mounting, and said armature and its counterweight being of such weight and in such position relative to said semaphore member and electro-magnet that the preponderance is on one side of the mounting when said electro-magnet is deënergized, but is transferred to the other side of said mounting when said electro-magnet is energized.

6. In signal apparatus, a semaphore member, an electro-magnet connected to said semaphore member and having a mounting on which it swings up and down, an armature element for said electro-magnet mounted to swing up and down with said electro-magnet and also to swing substantially in the plane of swinging of said electro-magnet, toward or away from said electro-magnet as said electro-magnet is energized or deënergized, with its center of gravity located on the side of said mounting away from said electro-magnet and being of such weight and in such position relative to said electro-magnet and the resistance of the semaphore member connected thereto that the preponderance is on one side the mounting when said electro-magnet is deënergized, but is transferred to the other side of said mounting when said electro-magnet is energized, a light source, a semaphore element connected to said semaphore member whereby said element is moved in opposite directions, and being before said light source when moved in one direction and being moved away from before said source when moved in the other direction.

7. In signal apparatus, a semaphore member, an electro-magnet connected to said semaphore member and having a mounting on which it swings up and down, an armature element for said electro-magnet mounted to swing up and down with said electro-magnet and also to swing substantially in the plane of swinging of said electro-magnet, toward or away from said electro-magnet as said electro-magnet is energized or deënergized, with its center of gravity located on the side of said mounting away from said electro-magnet and being of such weight and in such position relative to said electro-magnet and the resistance of the semaphore member connected thereto that the preponderance is on one side the mounting when said electro-magnet is deënergized, but is transferred to the other side of said mounting when said electro-magnet is energized, a light source, a colored light-transmitting semaphore element connected to said semaphore member whereby said element is moved in opposite directions, and being before said light source when moved in one direction and being partially before said source when moved in the other direction.

8. In signal apparatus, a semaphore member having a mounting on which it swings up and down, an electro-magnet mounted on said member with its center of gravity disposed at one side of said mounting, an armature element for said electro-magnet mounted on said semaphore member to move substantially in the plane of swinging of said semaphore member, toward or away from said electro-magnet as said electro-magnet is energized or deënergized, with its center of gravity located on the other side of said mounting, and being of such weight and in such position relative to said semaphore member and electro-magnet that the preponderance is on one side of the mounting when said electro-magnet is deënergized, but is transferred to the other side of said mounting when said electro-magnet is energized, a light source, a plurality of semaphore elements connected to said semaphore member and disposed at opposite sides of said mounting whereby said elements are moved in opposite directions, one of said elements being before said light source when moved in one direction and being moved away from before said source when moved in the other direction, and the other element being moved in one direction and displayed when the transparent element is moved away from before said source, and means whereby this other element is concealed when it moves in the other direction.

JOHN EMIL SULLIVAN.

Witnesses:
 IRENE PARKER,
 CLARENCE PERDEW.